(12) United States Patent
Ree et al.

(10) Patent No.: US 8,462,641 B2
(45) Date of Patent: Jun. 11, 2013

(54) POWER LOSS PACKET PRIORITY

(75) Inventors: Bradley Richard Ree, Cumming, GA (US); Ajay Pal Singh Grewal, Rochester, NY (US); Thomas Clayton Mayo, Honeoye Falls, NY (US)

(73) Assignee: General Electric Company, Schenectady, NY (US)

( * ) Notice: Subject to any disclaimer, the term of this patent is extended or adjusted under 35 U.S.C. 154(b) by 211 days.

(21) Appl. No.: 13/069,720

(22) Filed: Mar. 23, 2011

(65) Prior Publication Data

US 2012/0243421 A1    Sep. 27, 2012

(51) Int. Cl.
*H04J 1/16*    (2006.01)

(52) U.S. Cl.
USPC ..... 370/242; 370/412; 455/67.11; 455/115.1; 455/226.1

(58) Field of Classification Search
USPC .............. 370/242, 252, 412, 400; 455/67.11, 455/115.1, 226.1
See application file for complete search history.

(56) References Cited

U.S. PATENT DOCUMENTS

| | | |
|---|---|---|
| 6,195,018 B1 | 2/2001 | Ragle et al. |
| 6,657,552 B2 | 12/2003 | Belski et al. |
| 6,963,285 B2 | 11/2005 | Fischer et al. |
| 7,393,048 B2 | 7/2008 | Mori |
| 7,610,393 B1 | 10/2009 | Chen et al. |
| 7,830,874 B2 | 11/2010 | Cornwall et al. |
| 2004/0138834 A1* | 7/2004 | Blackett et al. ............ 702/62 |
| 2006/0244631 A1 | 11/2006 | Zigdon et al. |
| 2009/0135716 A1* | 5/2009 | Veillette ............ 370/221 |
| 2009/0184835 A1 | 7/2009 | Deaver, Sr. et al. |
| 2009/0219937 A1* | 9/2009 | Liu et al. ............ 370/392 |
| 2011/0077790 A1* | 3/2011 | Vaswani et al. ............ 700/291 |
| 2012/0036250 A1* | 2/2012 | Vaswani et al. ............ 709/224 |
| 2012/0126994 A1* | 5/2012 | Sobotka et al. ............ 340/870.02 |
| 2012/0126995 A1* | 5/2012 | Sobotka et al. ............ 340/870.03 |

OTHER PUBLICATIONS

Neptune Technology Group, R450 Mini Data Collector Product Sheet, Jan. 1, 2011, pp. 1-2, XP55030701, Tallassee, AL 36078, USA, URL: http://www.google.com/url?sa=t&rct=&j&q=&esrc=s&source=web&cd=1&ved=0CFsQFjAA&url=http%3A%2F%2Fknowledge.neptunetg.com%2Fcms%2Fcard-download.ashx%3Fid%3D9359&ei=H7QzULC8NMjYywHM3oHoCQ&usg=AFQjCNFNr2Bz6pOpjdywQtqRyg5vl7a4JA&sig2=Mz589Cfmy8u6j.
ASAP-SG, et al., Security Profile for Advanced Metering Infrastructure, Dec. 10, 2009, pp. 1-149, XP55030702, 620 Mabry Hood Road Knoxville, TN 37923 USA, URL: http://osgug.ucaiug.org/utilisec/amisec/Shared%20Documents/AMI%20Security%20Profile%20(ASAP-SG)/AMI%20Security%20Profile%20-%20v1_0.pdf.
James Ketchledge, Enhancing Outage Management With AMI, Utility Automation & Engineering T&D, Feb. 1, 2008, pp. 1-2, XP55030705.
Search Report issued in connection with EP Application No. 12160039.9, Jul. 2, 2012.

* cited by examiner

*Primary Examiner* — Andrew Lee
(74) *Attorney, Agent, or Firm* — Hoffman Warnick LLC; William Heinze

(57) ABSTRACT

An advanced metering infrastructure (AMI) enabled device, program product and communication system. An AMI enabled device is described that includes a power failure detection system that constructs a power loss message in response to a detected loss of power and a communication system for transmitting messages over a network. The communications system includes: a prioritization system for prioritizing the power loss message as a high priority message, and a queuing system that ensures that the power loss message is transmitted ahead of all low priority messages.

19 Claims, 3 Drawing Sheets

US 8,462,641 B2

POWER LOSS PACKET PRIORITY

BACKGROUND OF THE INVENTION

The present invention relates generally to managing power loss situations in a utility grid, and more particularly to prioritizing data packets being transmitted during a power loss condition in an advanced metering infrastructure.

Whenever a power loss condition occurs within a utility grid, immediate notification of the power loss back to the head end is critical if the problem is to be rectified with as little delay as possible. In an advanced metering infrastructure (AMI), meters and other devices are typically equipped with some type of communication system, e.g., a wireless Internet connection, a cellular telephone, etc., and often act as nodes within a network to route data. Such communication systems allow devices to, among other things, report power loss situations. However, devices such as meters are often only equipped with a very time limited back-up power supply (e.g., a super capacitor). Accordingly, such devices have only a very short period to transmit a power loss condition.

In a mesh network, the meter acts not only as a source of data, but also as a router that is responsible for relaying all types of data, e.g., status messages. Thus, during power loss, there may be several packets that may need to be transmitted, but not enough power to transmit all the packets. In the case where multiple nodes experience power loss, the ability of a mesh network to effectively communicate power loss data is further diminished as any number of devices may power off before power loss data can be routed through the network.

BRIEF DESCRIPTION OF THE INVENTION

Described is a metering infrastructure that assigns a higher priority to packets carrying power loss messages at a source meter. Transmission of power loss packets will be moved to a higher priority to address cases where more than one packet needs to be transmitted.

In one aspect, the invention provides an advanced metering infrastructure (AMI) enabled device, comprising: a power failure detection system that constructs a power loss message in response to a detected loss of power; and a communication system for transmitting messages over a network, wherein the communication system includes: a prioritization system for prioritizing the power loss message as a high priority message, and a queuing system that ensures that the power loss message is transmitted ahead of a low priority message.

In another aspect, the invention provides a program product stored on a non-transitory computer readable storage medium for processing messages in an advanced metering infrastructure (AMI) device, comprising: program code that recognizes a power loss message in response to a detected loss of power; program code for prioritizing messages, wherein the power loss message is prioritized as a high priority message; and program code that ensures that the power loss message is transmitted ahead of a low priority message.

In a further aspect, the invention provides a communication system for communicating data associated with an advanced metering infrastructure (AMI) device, comprising: a power failure detection system that identifies a power loss message; a prioritization system that prioritizes the power loss message as a high priority message; and a queuing system that ensures that the power loss message is transmitted ahead of all low priority messages.

DETAILED DESCRIPTION OF THE INVENTION

Figure 1:
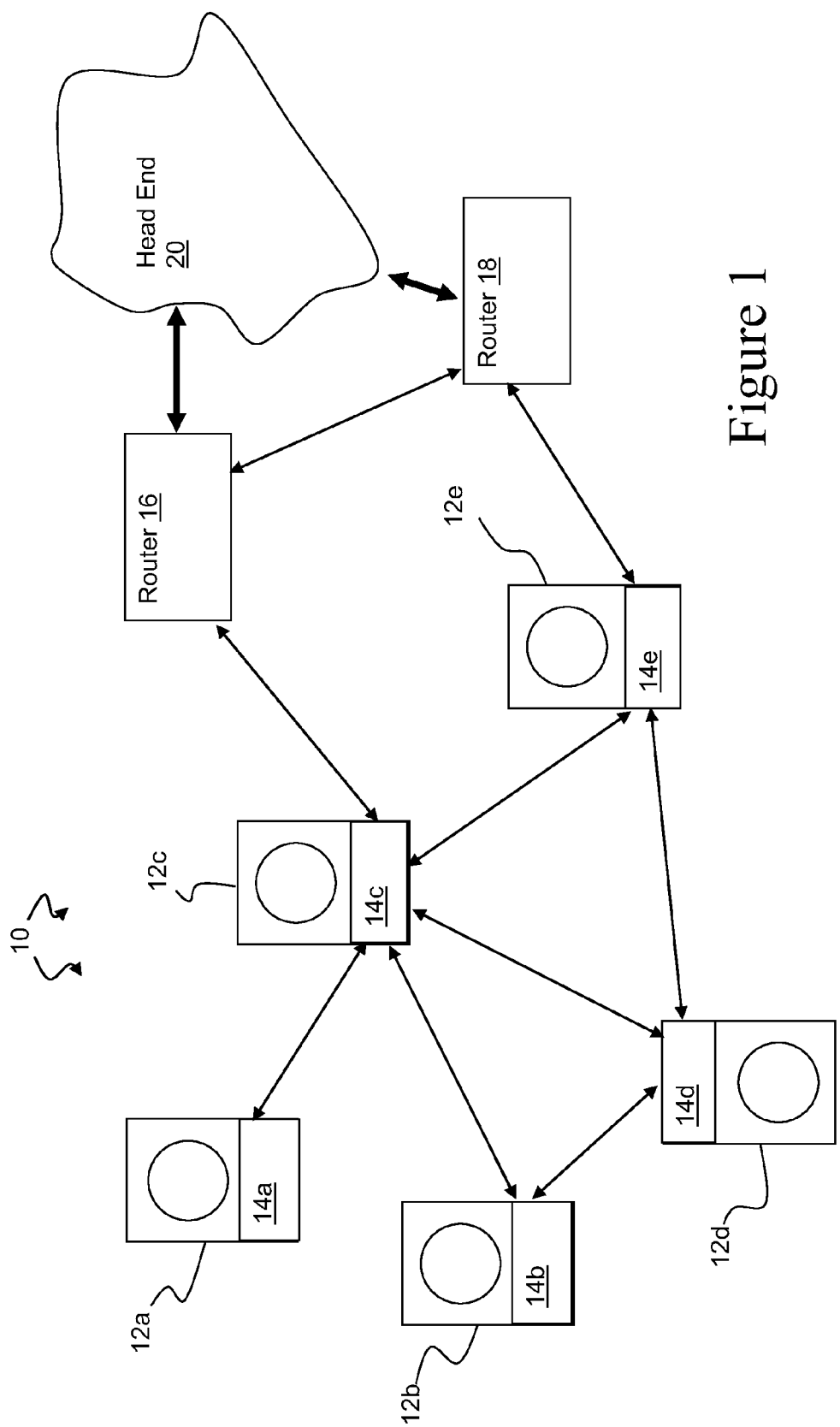
FIG. 1 is a schematic diagram of an AMI according to one embodiment of the invention.

FIG. 1 depicts an illustrative advanced metering infrastructure (AMI) 10 that utilizes a mesh network to connect a plurality of devices enabled to operate within infrastructure 10, including a set of meters 12a, 12b, 12c, 12d, 12e, routers 16, 18 and a head end 20. It is understood that AMI 10 depicts a simplified infrastructure and that an actual implementation may include hundreds or thousands of devices, including devices not specifically shown in FIG. 1. In addition, although shown as a mesh network, it us understood that any type of network infrastructure could be implemented, e.g., point-to-point, Ethernet, power line carrier (PLC), cellular, WiMAX, etc. As shown, each meter 12a, 12b, 12c, 12d, 12e includes a respective communication system 14a, 14b, 14c, 14d, 14e capable of acting as a send and/or receive node (i.e., router) in the mesh network. As described in further detail herein, each communication system 14a, 14b, 14c, 14d, 14e includes a mechanism for prioritizing data communications, and more particularly includes a system for assigning a high priority to data messages involving power loss conditions occurring at one or more nodes in the mesh network.

Figure 2:
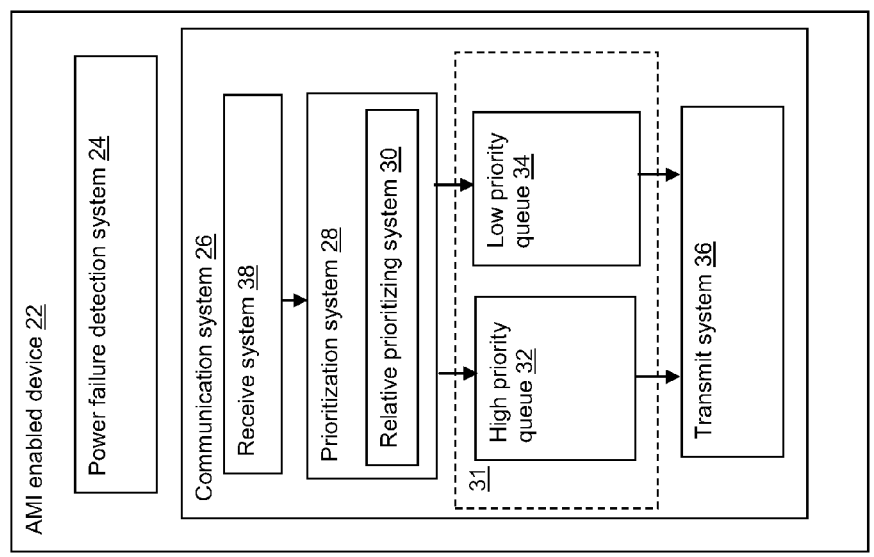
FIG. 2 is a schematic diagram of an AMI enabled device capable of prioritizing messages according to one embodiment of the present invention.

FIG. 2 depicts an illustrative embodiment of an AMI enabled device 22, such as a smart meter, having such capabilities. As shown, AMI enabled device 22 includes a power failure detection system 24 for detecting a power failure condition at the location of the AMI enabled device 22 and a communication system 26 for communicating data packets using receive system 38, transmit system 36 and queuing system 31. In one embodiment, power failure detection system 24 may include any combination of hardware and/or software to detect a physical power loss, e.g., a gated circuit that outputs a binary 1 when power is off. In another embodiment, power failure detection system 24 may simply include a combination of hardware and/or software to identify a power loss message generated from an associated device, e.g., a computer program, ASIC (application specific integrated circuit) device, or NIC that interprets an input or portion of a message as being associated with a power loss condition. Receive system 38 is capable of receiving data packets from the AMI enabled device 22 itself or from other devices in the network. For example, in the case where AMI enabled device 22 comprises an electricity usage meter, receive system 38 can be configured to receive meter data regarding electricity usage. Further, receive system 38 may be configured to receive data from a nearby meter, e.g., via a wireless signal, for routing purposes within a mesh network. Transmit system 36 is responsible for transmitting data from the AMI enabled device 22 to the network. Any type of device or system may be utilized to receive and transmit data, e.g., a modem, a cellular device, a router, etc.

Communication system 26 further includes a prioritization system 28 for prioritizing data packets into either a high priority queue 32 or a low priority queue 34 within queuing system 31. Data packets may utilize an indicator, e.g., a priority indicator bit, to indicate if the message contains a power loss condition. In one embodiment, the message may include an encrypted portion and an unencrypted portion, with the power loss information and or indicator bit being stored in an unencrypted portion of a message to reduce processing overhead. In another embodiment, the entire message may be encrypted to provide secure power loss notification.

High priority queue 32 is utilized to hold data packets containing power loss messages. For example, upon detection of a power loss, power failure detection system 24 forwards an appropriate power loss message, with the priority indicator bit turned on, to the communication system 26 for transmission across the network to the head end. Upon receipt, prioritization system 28 examines the priority indicator bit, recognizes the bit is turned on and places the power loss message into the high priority queue 32. Conversely, data packets being sent and received during normal operations (e.g., meter data) are placed in the low priority queue 34. Transmit system 36 processes and transmits data packets from the high priority queue 32 first, irrespective of when the data packets arrived.

Accordingly, when a power loss occurs at AMI network device 22, communication system 26 may only have a few seconds of back-up power in which to transmit data packets. Because the power failure message is placed in the high priority queue 32, the message has a much greater chance of being successfully transmitted. Similarly, if receive system 38 receives a power failure message from a nearby device, that message is also placed into the high priority queue 32, increasing the likelihood that it will be successfully sent before a collapse of the network.

Relative prioritizing system 30 may be utilized to prioritize multiple messages in the high priority queue 32. For example, a power loss message may be assigned a relatively higher priority among multiple power loss messages based on the number of devices the message traversed, i.e., "hopped" through. In such an embodiment, a priority bit set could be used to not only identify a power loss message, but also indicate the number of hops a packet has traveled. Thus, the farthest node that lost power could be determined before the mesh collapses from lack of power. In other situations, the packet that has the lowest hop count could be used for higher priority. In other situations, a first in first out process can be used. To track this, the priority bit set could for instance include an n-bit field that gets incremented whenever the message is processed by a device.

Figure 3:
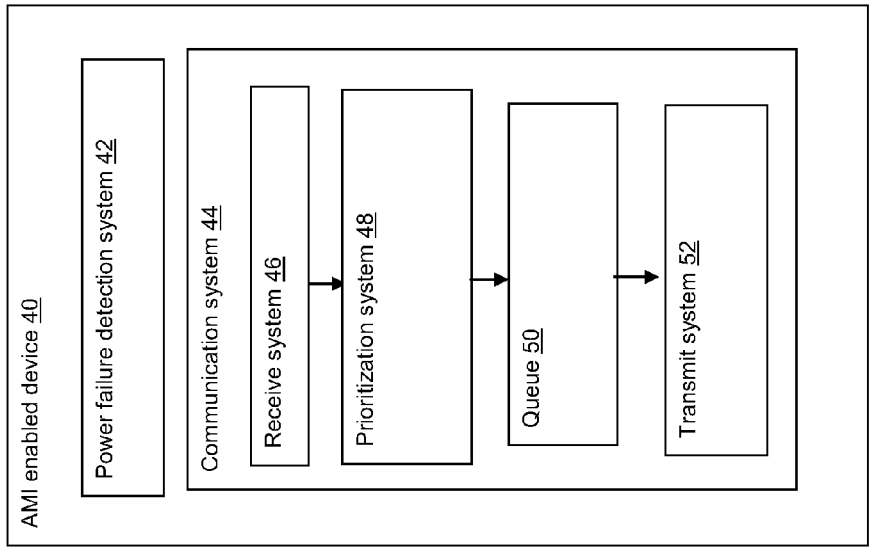
FIG. 3 is a schematic diagram of an AMI enabled device capable of prioritizing messages according to another embodiment of the present invention.

FIG. 3 depicts an alternative embodiment in which the queuing system comprises a single queue 50. In this case, AMI enabled device 40 includes a power failure detection system 42 and a communication system 44 having a receive system 46 and a transmit system 52, similar to that described with reference to FIG. 2. However, AMI enabled device 40 utilizes a single queue 50 and a prioritization system 48 that is configured to prioritize power failure messages at the front of the queue 50, ahead of all other data packets. In the event that multiple power failure messages are placed into the queue 50, prioritization system 48 can employ any algorithm for prioritizing those messages, e.g., first in first out, based on the number of hops a packet has traveled, etc.

Note that AMI enabled devices 22, 40 may be implemented using one or more distinct components. For instance, power failure detection system 42 may be implemented within, e.g., a meter, while communication system 26 may be implemented within a network interface controller (NIC) integrated with the meter. Alternatively, power failure detection system 42 and communication system 26 may be implemented completely within a single device such as a meter or a NIC.

Figure 4:
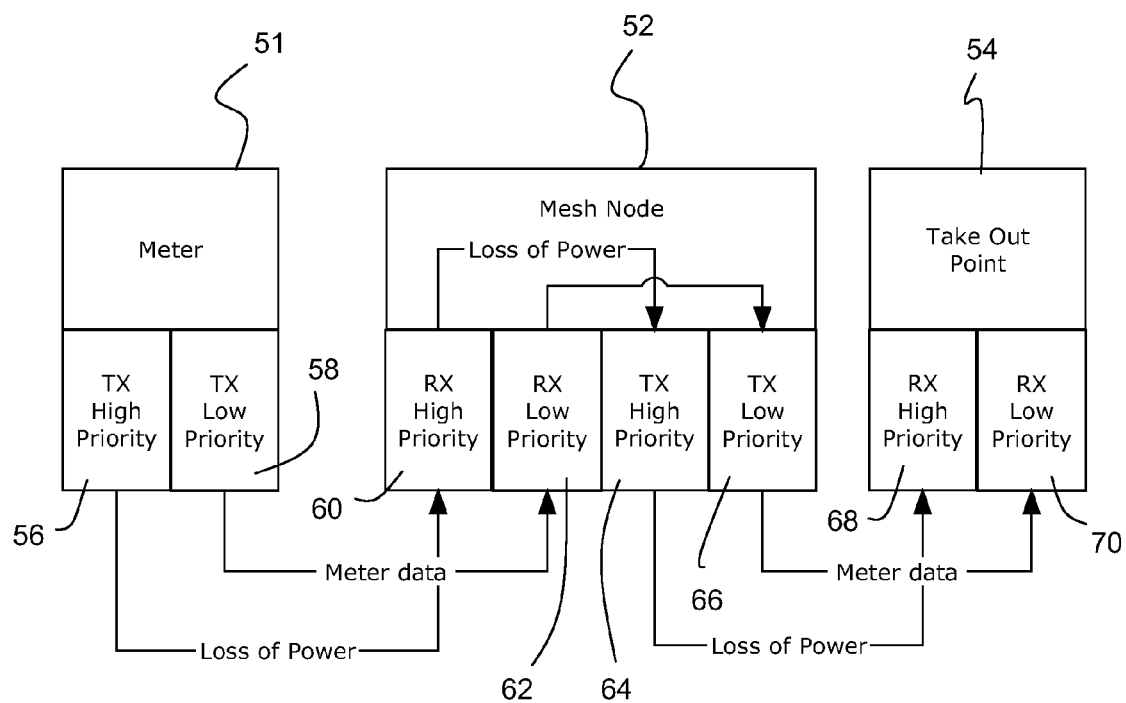
FIG. 4 is a schematic diagram of an infrastructure that utilizes high and low priority queues according to one embodiment of the present invention.

Note that the queuing systems described in FIGS. 2 and 3 may be implemented to include one or both a receive queue and a transmit queue. FIG. 4 depicts an infrastructure that shows the use of both receive (RX) and transmit (TX) queues. The embodiment includes three devices, a meter 51, a mesh node 52 and a take out point 54. As shown, meter 51 includes a high priority transmit queue 56 for transmitting power loss messages and a low priority transmit queue 58 for transmitting meter data. Mesh node 52 includes a high priority receive queue 60 for receiving power loss messages and a low priority receive queue 62 for receiving meter data. Mesh node 52 also includes a high priority transmit queue 64 for transmitting power loss messages and a low priority transmit queue for transmitting meter data. Take out point 54 includes a high priority receive queue 68 for receiving power loss messages and a low priority receive queue 70 for receiving meter data. As can be seen, this infrastructure allows power loss messages to have a highest likelihood of reaching the take out point 54.

Technical effects of the invention include a mechanism to assign priority to packets that carry power loss messages at a source meter. Transmission of these higher priority packets will be moved either to a high priority queue or the front of a shared queue. Indication of a power loss packet can be provided in an unencrypted portion of the packet, thus allowing the mechanism to quickly recognize and process the packet into the appropriate queue without the need for decryption.

In various embodiments of the present invention, aspects of the systems and methods described herein can be implemented in the form of an entirely hardware embodiment, an entirely software embodiment or an embodiment containing both hardware and software elements. In one embodiment, the processing functions may be implemented in software, which includes but is not limited to firmware, resident software, microcode, etc.

Furthermore, the processing functions can take the form of a computer program product accessible from a computer-usable or computer-readable medium providing program code for use by or in connection with a computer or any instruction execution system (e.g., processing units). For the purposes of this description, a computer-usable or computer readable medium can be any computer readable storage medium that can contain or store the program for use by or in connection with the computer, instruction execution system, apparatus. Additional embodiments may be embodied on a computer readable transmission medium (or a propagation medium) that can communicate, propagate or transport the program for use by or in connection with the computer, instruction execution system, apparatus, or device.

The computer readable medium can be an electronic, magnetic, optical, electromagnetic, infrared, or semiconductor system (or apparatus or device). Examples of a computer-readable medium include a semiconductor or solid state memory, a random access memory (RAM), a read-only memory (ROM), a rigid magnetic disk and an optical disk. Current examples of optical disks include a compact disk-read only memory (CD-ROM), a compact disk-read/write (CD-R/W) and a digital video disc (DVD).

In any event, AMI enabled devices described herein can comprise one or more general purpose computing articles of manufacture (e.g., computing devices) capable of executing program code installed thereon. As used herein, it is understood that "program code" means any collection of instructions, in any language, code or notation, that cause a computing device having an information processing capability to perform a particular function either directly or after any combination of the following: (a) conversion to another language, code or notation; (b) reproduction in a different material form; and/or (c) decompression. To this extent, the systems and devices described herein can be embodied as any combination of system software and/or application software.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

While the disclosure has been particularly shown and described in conjunction with a preferred embodiment thereof, it will be appreciated that variations and modifications will occur to those skilled in the art. Therefore, it is to be understood that the appended claims are intended to cover all such modifications and changes as fall within the true spirit of the disclosure.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. An advanced metering infrastructure (AMI) enabled device, comprising:
   a power failure detection system that constructs a power loss message in response to a detected loss of power; and
   a communication system for transmitting messages over a network, wherein the communication system includes:
   a prioritization system for prioritizing the power loss message as a high priority message, and
   a queuing system that ensures that the power loss message is transmitted ahead of a low priority message,
   wherein the power loss message includes an encrypted portion and an unencrypted portion, and the prioritization system inspects an indicator stored in an unencrypted portion of a received message to determine if the received message is a power loss message.

2. The AMI enabled device of claim 1, wherein the AMI enabled device comprises a meter and the low priority message includes meter data.

3. The AMI enabled device of claim 1, wherein the queuing system includes a high priority queue and a low priority queue.

4. The AMI enabled device of claim 1, wherein the queuing system include a single queue for handling both high priority messages and low priority messages.

5. The AMI enabled device of claim 1, wherein the communication system further includes a receive system for receiving and routing messages from other AMI enabled devices, wherein the prioritization system prioritizes a received power loss message as a high priority message.

6. The AMI enabled device of claim 5, wherein the prioritization system includes a relative prioritizing system for prioritizing multiple high priority messages.

7. The AMI enabled device of claim 6, wherein the multiple high priority messages are prioritized based on a number of devices traversed by each of the multiple high priority messages.

8. The AMI enabled device of claim 1, wherein the queuing system includes a transmit queue and a receive queue.

9. A program product stored on a non-transitory computer readable storage medium for processing messages in an advanced metering infrastructure (AMI) enabled device, comprising:
   program code that recognizes a power loss message in response to a detected loss of power;
   program code for prioritizing messages, wherein the power loss message is prioritized as a high priority message; and
   program code that ensures that the power loss message is transmitted ahead of a low priority message,
   wherein the program code for prioritizing messages inspects an indicator stored in an unencrypted portion of a received message to determine if the received message is a power loss message.

10. The program product of claim 9, wherein the AMI enabled device comprises a meter and the low priority message includes meter data.

11. The program product of claim 9, further comprising a queuing system having a high priority queue and a low priority queue.

12. The program product of claim 9, further comprising a queuing system having a single queue for handling both high priority messages and low priority messages.

13. The program product of claim 9, further comprising program code for routing messages from other AMI enabled devices, wherein the program code for prioritizing messages prioritizes a received power loss message as a high priority message.

14. The program product of claim 13, wherein the program code for prioritizing messages includes program code for prioritizing multiple high priority messages.

15. The program product of claim 14, wherein the multiple high priority messages are prioritized based on a number of devices traversed by each of the multiple high priority messages.

16. A communication system for communicating data associated with an advanced metering infrastructure (AMI) device, comprising:
   a power failure detection system that identifies a power loss message;
   a prioritization system that prioritizes the power loss message as a high priority message; and
   a queuing system that ensures that the high priority message is transmitted ahead of all low priority messages,
   wherein the high priority message includes an encrypted portion and an unencrypted portion, and wherein an indicator stored in the unencrypted portion designates containing a power loss condition.

17. The communication system of claim 16, wherein the queuing system includes a high priority queue and a low priority queue.

18. An advanced metering infrastructure (AMI) enabled device, comprising:
   a power failure detection system that constructs a power loss message in response to a detected loss of power; and
   a communication system for transmitting messages over a network, wherein the communication system further includes a receive system for receiving and routing messages from other AMI enabled devices, and wherein the communication system includes:

a prioritization system for prioritizing the power loss message as a high priority message, wherein the prioritization system includes a relative prioritizing system for prioritizing multiple high priority messages, wherein the multiple high priority messages are prioritized based on a number of devices traversed by each of the multiple high priority messages; and a queuing system that ensures that the power loss message is transmitted ahead of a low priority message.

19. A program product stored on a non-transitory computer readable storage medium for processing messages in an advanced metering infrastructure (AMI) enabled device, comprising:

program code that recognizes a power loss message in response to a detected loss of power;

program code for prioritizing messages, wherein the power loss message is prioritized as a high priority message, wherein the program code for prioritizing messages includes program code for prioritizing multiple high priority messages, wherein the multiple high priority messages are prioritized based on a number of devices traversed by each of the multiple high priority messages;

program code that ensures that the power loss message is transmitted ahead of a low priority message; and program code for routing messages from other AMI enabled devices, wherein the program code for prioritizing messages prioritizes a received power loss message as a high priority message.

* * * * *